(12) United States Patent
Sahu (10) Patent No.: US 7,927,731 B2
(45) Date of Patent: Apr. 19, 2011

(54) REDOX FLOW CELL

(75) Inventor: Saroj Kumar Sahu, Mountain House, CA (US)

(73) Assignee: Deeya Energy, Inc., Fremont, CA (US)

( * ) Notice: Subject to any disclaimer, the term of this patent is extended or adjusted under 35 U.S.C. 154(b) by 356 days.

(21) Appl. No.: 12/217,059

(22) Filed: Jul. 1, 2008

(65) Prior Publication Data

US 2010/0003586 A1    Jan. 7, 2010

(51) Int. Cl.
   *H01M 6/24*      (2006.01)
   *H01M 8/20*      (2006.01)

(52) U.S. Cl. ......... 429/101; 429/450; 429/477; 429/498

(58) Field of Classification Search .................... None
See application file for complete search history.

(56) References Cited

U.S. PATENT DOCUMENTS

| | | |
|---|---|---|
| 3,540,934 A | 11/1970 | Boeke |
| 3,996,064 A | 12/1976 | Thaller |
| 4,133,941 A | 1/1979 | Sheibley |
| 4,159,366 A | 6/1979 | Thaller |
| 4,309,372 A | 1/1982 | Sheibley |
| 4,312,735 A | 1/1982 | Grimes et al. |
| 4,414,090 A | 11/1983 | D'Agostino et al. |
| 4,454,649 A | 6/1984 | Jalan et al. |
| 4,468,441 A | 8/1984 | D'Agostino et al. |
| 4,485,154 A | 11/1984 | Remick et al. |
| 4,496,637 A | 1/1985 | Shimada et al. |
| 4,543,302 A | 9/1985 | Gahn et al. |
| 4,732,827 A | 3/1988 | Kaneko et al. |
| 4,784,924 A * | 11/1988 | Savinell et al. ............... 429/109 |
| 4,786,567 A | 11/1988 | Skyllas-Kazacos et al. |
| 4,814,241 A | 3/1989 | Nagashima et al. |
| 4,828,666 A | 5/1989 | Iizuka et al. |
| 4,849,311 A | 7/1989 | Itoh et al. |
| 4,874,483 A | 10/1989 | Wakabayashi et al. |
| 4,882,241 A | 11/1989 | Heinzel |
| 4,894,294 A | 1/1990 | Ashizawa et al. |
| 4,929,325 A | 5/1990 | Bowen et al. |
| 4,945,019 A | 7/1990 | Bowen et al. |

(Continued)

FOREIGN PATENT DOCUMENTS

DE     102006007206     10/2006

(Continued)

OTHER PUBLICATIONS

PCT International Search Report and the Written Opinion mailed Aug. 31, 2009, in related International Application No. PCT/US2009/049285.

(Continued)

*Primary Examiner* — Dah-Wei Yuan
*Assistant Examiner* — Angela J. Martin
(74) *Attorney, Agent, or Firm* — Haynes and Boone, LLP (57) ABSTRACT

A redox flow cell is presented that utilizes a porous membrane separating a first half cell and a second half cell. The porous membrane is chosen to have a figure of merit (FOM) is at least a minimum FOM. A method of providing a porous membrane for a flow cell can include determining a figure of merit; determining a first parameter from a pore size or a thickness for the porous membrane; determining a second parameter from the pore size or the thickness that is not the first parameter for the porous membrane, based on the figure of merit; and constructing a porous membrane having the pore size and the thickness.

5 Claims, 3 Drawing Sheets

U.S. PATENT DOCUMENTS

| | | | |
|---|---|---|---|
| 4,948,681 A | 8/1990 | Zagrodnik et al. |
| 4,956,244 A | 9/1990 | Shimizu et al. |
| 5,026,479 A | 6/1991 | Bikson et al. |
| 5,061,578 A | 10/1991 | Kozuma et al. |
| 5,126,054 A | 6/1992 | Matkovich |
| 5,162,168 A | 11/1992 | Downing et al. |
| 5,188,911 A | 2/1993 | Downing et al. |
| 5,258,241 A | 11/1993 | Ledjeff et al. |
| 5,366,824 A | 11/1994 | Nozaki et al. |
| 5,648,184 A | 7/1997 | Inoue et al. |
| 5,656,390 A | 8/1997 | Kageyama et al. |
| 5,665,212 A | 9/1997 | Zhong et al. |
| 5,759,711 A | 6/1998 | Miyabayashi et al. |
| 5,851,694 A | 12/1998 | Miyabayashi et al. |
| 5,854,327 A | 12/1998 | Davis et al. |
| 5,919,330 A | 7/1999 | Pall et al. |
| 6,005,183 A | 12/1999 | Akai et al. |
| 6,040,075 A | 3/2000 | Adcock et al. |
| 6,086,643 A | 7/2000 | Clark et al. |
| 6,225,368 B1 | 5/2001 | D'Agostino et al. |
| 6,387,964 B1 | 5/2002 | D'Agostino et al. |
| 6,461,772 B1 | 10/2002 | Miyake et al. |
| 6,475,661 B1 | 11/2002 | Pellegri et al. |
| 6,509,119 B1 | 1/2003 | Kobayashi et al. |
| 6,524,452 B1 | 2/2003 | Clark et al. |
| 6,555,267 B1 | 4/2003 | Broman et al. |
| 6,562,514 B1 | 5/2003 | Kazacos et al. |
| 6,692,862 B1 | 2/2004 | Zocchi |
| 6,759,158 B2 | 7/2004 | Tomazic |
| 6,761,945 B1 | 7/2004 | Adachi et al. |
| 6,764,789 B1 | 7/2004 | Sekiguchi et al. |
| 6,905,797 B2 | 6/2005 | Broman et al. |
| 6,986,966 B2 | 1/2006 | Clarke et al. |
| 7,061,205 B2 | 6/2006 | Shigematsu et al. |
| 7,078,123 B2 * | 7/2006 | Kazacos et al. ........... 429/105 |
| 7,199,550 B2 | 4/2007 | Tsutsui et al. |
| 7,220,515 B2 | 5/2007 | Ito et al. |
| 7,227,275 B2 | 6/2007 | Hennessy et al. |
| 2002/0127474 A1 | 9/2002 | Fleischer et al. |
| 2003/0008203 A1 | 1/2003 | Winter |
| 2003/0091886 A1 | 5/2003 | Tanioka et al. |
| 2004/0170893 A1 | 9/2004 | Nakaishi et al. |
| 2004/0202915 A1 | 10/2004 | Nakaishi et al. |
| 2004/0241544 A1 | 12/2004 | Nakaishi et al. |
| 2005/0074653 A1 | 4/2005 | Broman et al. |
| 2005/0156431 A1 | 7/2005 | Hennessy |
| 2005/0156432 A1 | 7/2005 | Hennessy |
| 2005/0158615 A1 | 7/2005 | Samuel et al. |
| 2005/0164075 A1 | 7/2005 | Kumamoto et al. |
| 2005/0181273 A1 | 8/2005 | Deguchi et al. |
| 2005/0260473 A1 | 11/2005 | Wang |
| 2007/0072067 A1 | 3/2007 | Symons et al. |
| 2007/0080666 A1 | 4/2007 | Ritter et al. |
| 2007/0111089 A1 | 5/2007 | Swan |
| 2010/0003586 A1 | 1/2010 | Sahu |
| 2010/0092757 A1 | 4/2010 | Nair |
| 2010/0092807 A1 | 4/2010 | Sahu |
| 2010/0092813 A1 | 4/2010 | Sahu |
| 2010/0092843 A1 | 4/2010 | Conway |
| 2010/0094468 A1 | 4/2010 | Sahu |
| 2010/0136455 A1 | 6/2010 | Winter |

FOREIGN PATENT DOCUMENTS

| | | |
|---|---|---|
| JP | 60047373 | 3/1985 |
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |
| JP | 2005142056 | 6/2005 |
| JP | 2005228622 | 8/2005 |
| JP | 2005228633 | 8/2005 |
| JP | 2005322447 | 11/2005 |
| JP | 2006114360 | 4/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 | 6/1989 |
| WO | 9003666 | 4/1990 |
| WO | 9306626 | 4/1993 |
| WO | 03005476 | 1/2003 |
| WO | 03015207 | 2/2003 |
| WO | 2004079849 | 9/2004 |
| WO | 2006135958 | 12/2006 |

OTHER PUBLICATIONS

Search Report for PCT Application No. PCT/US2009/060281.

Gahn et al., "Cycling Performance of the Iren-Chromium Redox Energy Storage System", NASA TM-87034, 20th Intersociety Energy Conversion Engineering Conference, Miami Beach, FL, Aug. 18.23, 1985.

Hruska at al., "Investigation of Factors Affecting Performance of the Iron-Redox Battery", *Journal of Electrochemical Society*, vol. 128. No. 1, Jen. 1981, pp. 18-25.

M. Lopez-Atalaya at al., "Optimization Studies on a Fe/Cr Redox Flow Battery", *Journal of Power Sources*, vol. 39, 1992, pp. 147-154.

* cited by examiner

REDOX FLOW CELL

BACKGROUND

1. Technical Field

The present invention relates to the field of reduction-oxidation (redox) flow batteries or redox flow cells and, in particular, to redox flow batteries that include an ion exchange membrane (IEM) that achieves an advantageous figure-of-merit (FOM) to improve Voltage and Coulombic Efficiency.

2. Discussion of Related Art

Reduction-oxidation (redox) flow batteries store electrical energy in a chemical form, and subsequently dispense the stored energy in an electrical form via a spontaneous reverse redox reaction. Aspects of redox flow batteries incorporating external liquid electrolytes have been described in, for example, U.S. Pat. No. 3,996,064 to Thaller, which is herein incorporated by reference in its entirety.

A redox flow battery is an electrochemical storage device in which an electrolyte containing one or more dissolved electro-active species flows through a reactor cell where chemical energy is converted to electrical energy. Conversely, the discharged electrolyte can be flowed through a reactor cell such that electrical energy is converted to chemical energy. Electrolyte is stored externally, for example in tanks, and flowed through a set of cells where the electrochemical reaction takes place. Externally stored electrolytes can be flowed through the battery system by pumping, gravity feed, or by any other method of moving fluid through the system. The reaction in a flow battery is reversible. The electrolyte, then, can be recharged without replacing the electroactive material. The energy capacity of a redox flow battery, therefore, is related to the total electrolyte volume, e.g., the size of the storage tank. The discharge time of a redox flow battery at full power also depends on electrolyte volume and often varies from several minutes to many days.

The minimal unit that performs the electrochemical energy conversion is generally called a "cell," whether in the case of flow batteries, fuel cells, or secondary batteries. A device that integrates many such cells, coupled electrically in series or parallel, to get higher current or voltage or both, is generally called a "battery." However, it is common to refer to any collection of coupled cells, including a single cell used on its own, as a battery. As such, a single cell can be referred to interchangeably as a "cell" or a "battery."

Redox flow batteries can be utilized in many technologies that require the storage of electrical energy. For example, redox flow batteries can be utilized for storage of night-time electricity that is inexpensive to produce to subsequently provide electricity during peak demand when electricity is more expensive to produce or demand is beyond the capability of current production. Such batteries can also be utilized for storage of green energy, i.e., energy generated from renewable sources such as wind, solar, wave, or other non-conventional sources.

Many devices that operate on electricity are adversely affected by the sudden removal of their power supply. Flow redox batteries can be utilized as uninterruptible power supplies in place of more expensive backup generators. Efficient methods of power storage can be used to construct devices having a built-in backup that mitigates the effects of power cuts or sudden power failures. Power storage devices can also reduce the impact of a failure in a generating station.

Other situations where uninterruptible power supplies can be of importance include, but are not limited to, buildings where uninterrupted power is critical, such as hospitals. Such batteries can also be utilized for providing an uninterruptible power supply in developing countries, many of which do not have reliable electrical power sources, resulting in intermittent power availability. Another possible use for redox flow batteries is in electric vehicles. Electric vehicles can be rapidly "recharged" by replacing the electrolyte. The electrolyte can be recharged separately from the vehicle and reused.

There is, therefore, a need for improved performance and longevity of redox flow cells and the batteries formed from them.

SUMMARY

Consistent with embodiments of the present invention, a reduction-oxidation flow cell having an advantageous ion exchange membrane is presented. A redox flow cell according to the present invention can include a first half cell having a first electrolyte; a second half cell having a second electrolyte; and a porous membrane separating the first half cell and the second half cell, the porous membrane having a figure-of-merit (FOM) that is at least a minimum FOM, wherein FOM=$(T^2\eta)/P$ where $T$ is a membrane thickness, $P$ is an average pore size of the membrane, and $\eta$ is an average viscosity of the first electrolyte and the second electrolyte.

A method of providing a porous membrane for a flow cell consistent with embodiments of the present invention includes determining a figure of merit; determining a first parameter from a pore size or a thickness for the porous membrane; determining a second parameter from the pore size or the thickness that is not the first parameter for the porous membrane, based on the figure of merit; and constructing a porous membrane having the determined pore size and thickness.

These and other embodiments of the present invention are further described below with reference to the following figures.

BRIEF DESCRIPTION OF THE DRAWINGS

In the figures, elements having the same designation have the same or substantially similar function. The figures are illustrative only. Relative sizes and distances depicted in the figures are for convenience of illustration and have no further meaning.

DETAILED DESCRIPTION

A redox flow cell is the minimal component of a redox battery. Multiple flow cells are coupled ("stacked") to form a multi-cell battery. The cell is made up of two half-cells separated by a membrane, through which ions are transferred during a redox reaction. One half-cell contains an anolyte and the other half-cell contains a catholyte, the anolyte and catholyte being collective referred to as electrolytes. The electrolytes (anolyte and catholyte) are flowed through the half-cells, often with an external pumping system. At least one electrode in each half cell provides a surface on which the redox reaction takes place and from which charge is transferred.

The redox flow cell works by changing the oxidation state of its constituents during charging or discharging. The two half-cells of the basic redox flow cell are connected in series by the conductive electrolytes, one for anodic reaction and the other for cathodic reaction. The electrode in each half-cell includes a defined surface area upon which the redox reaction takes place. Electrolyte flows through the half-cell as the redox reaction takes place. The two half-cells are separated by an ion-exchange membrane (IEM) where either positive ions or negative ions pass through the membrane. Multiple such cells can be electrically coupled ("stacked") either in series to achieve higher voltage or in parallel in order to achieve higher current. The reactant electrolytes are stored in separate tanks and dispensed into the cells as necessary in a controlled manner to supply electrical power to a load.

One of the problems of a redox flow cell is fouling of the IEM. IEMs that primarily conduct cations, such as $H^+$, are called Cationic Ion Exchange Membranes (CIEM) and IEMs that primarily conduct anions are called Anionic Ion Exchange Membranes (AIEM). IEMs are typically sheets of woven or non-woven plastic with active ion exchange materials such as resins or functionalities embedded either in a heterogeneous (such as co-extrusion) or homogeneous (such as radiation grafting) way. These ion exchange materials are active materials and are often chemically attacked by strong oxidizers, acids, and bases. As a result, the ion exchange capability of the membrane deteriorates with use causing the cell resistance to increase, resulting in lower cell efficiency and subsequently lowered system capacity.

The rate and degree of deterioration in the IEM is higher at higher electrolyte concentrations. However, the electrolyte concentration determines the system energy density, which most users would like to be high. As a result, manufacturers of flow batteries want to use a higher electrolyte concentration, but are forced to limits imposed by the rate of increased resistance of the membrane that results from the rate of deterioration.

Another problem encountered with redox flow cells is using IEMs at high temperatures. Many redox systems are better catalyzed at higher temperature, such as between 40 and 80° C. Additionally, at such higher temperatures, the solution resistances are lower, resulting in lower cell resistance and therefore better system efficiency and capacity. However, at higher temperatures, the ion selectivity of the membranes can be low, resulting in undesirable electrolyte cross-mixing in unmixed systems. For mixed-reactant systems cross-mixing is not an issue, but the concurrent increase in membrane resistance causes loss of system efficiency and capacity.

In order to circumvent some of these problems, porous membranes without any ion exchange material have been used in redox batteries. See M. Lopez-Atalaya et al in Journal of Power Sources, 39 (1992) 147-154. Lopez Atalaya et al. considered porous membranes in iron chromium flow batteries. However, poor performance was observed.

In some embodiments of the present invention, the redox reaction takes place completely in an aqueous acidic medium where both the start and end products are non-zero redox states. In a non-zero redox state, there is no plating, de-plating, or creation of any elemental state in the electrochemical process utilized in the flow cell.

Figure 1:
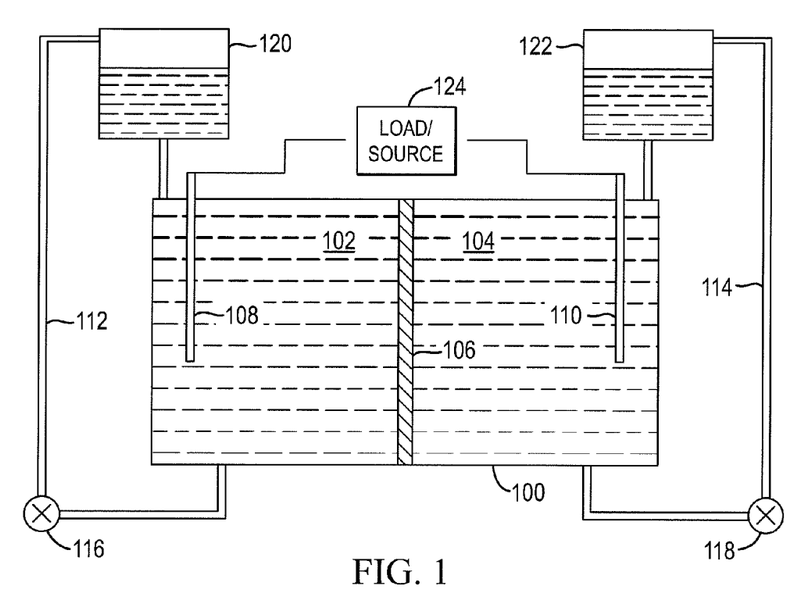
FIG. 1 illustrates a reduction-oxidation cell consistent with embodiments of the present invention.

FIG. 1 illustrates a redox flow cell 100 consistent with some embodiments of the present invention. Redox flow cell 100 includes two half-cells 102 and 104 separated by an ion exchange membrane (IEM) 106. Half-cells 102 and 104 include electrodes 108 and 110, respectively, in contact with an electrolyte such that an anodic reaction occurs at the surface of one of electrodes 108 or 110 and a cathodic reaction occurs at the surface of the other one of electrodes 108 or 110. Electrolyte flows through each of half-cells 102 and 104 as the redox reaction takes place.

As shown in FIG. 1, the electrolyte in half-cell 102 may be pumped through pipe 112 by pump 116 to holding tank 120. Similarly, the electrolyte in half-cell 104 can be pumped through pipe 114 by pump 118 to holding tank 122. In some embodiments, holding tank 122 may segregate electrolyte that has flowed through cell 100 from electrolyte that has not. However, mixing discharged or partially discharged electrolyte may also be performed.

Electrodes 108 and 110 can be coupled to either supply electrical energy or receive electrical energy from load or source 124. Other monitoring and control electronics, included in load 124, can control the flow of electrolyte through half-cells 102 and 104. Multiple ones of cells 100 can be electrically coupled ("stacked") in series to achieve higher voltage or in parallel in order to achieve higher current.

In some embodiments of the present invention, the redox reaction between the electrolytes and electrodes 108 and 110 does not involve any of the redox reactions reaching a zero-oxidation state. Therefore, the redox reactions with electrodes 108 and 110 do not result in plating or de-plating of any metals or elemental form of any constituents onto or from electrodes 108 and 110.

A flow battery such as that shown in FIG. 1 is different from a secondary battery because, in a flow battery, the majority of the electrolyte is kept outside of the cell volume and pumped into the cell as needed. Hence the power and energy capacity are decoupled in a flow battery. In a secondary battery, all of the electrolyte is stored within the cell volume, hence the power and energy capacity are coupled. Both a flow battery and a secondary battery are rechargeable.

A flow battery, an example cell of which is shown in FIG. 1, is different from a fuel cell in the sense that, although both work on electrochemical redox principles, a fuel is generally consumed in a fuel cell and the system is generally not rechargeable. Conventional fuel cell fuels include hydrogen, methanol, gasoline, or other hydrogen containing materials. The fuel must be continuously replenished to produce power. The electrolytes in a flow battery are rechargeable, and therefore an external fuel supply is not utilized in the production of electricity from the battery. Instead, a source of electricity is utilized during recharge of the flow battery.

Advantages of flow batteries over secondary batteries may include some or all of flexible device layout (due to separation of the power and energy components), long cycle life (because there are no solid-liquid solution phase changes), lack of harmful emissions generated, low maintenance, and tolerance to overcharge/overdischarge. Disadvantages may include the complicated apparatus, (including pumps, sensors, control units, secondary containment vessels, etc.) and low energy densities.

In some embodiments of redox cell 100 as shown in FIG. 1, an Fe/Cr redox pair is utilized. The redox pair would then include:

$$Fe^{3+}+e^- \rightarrow Fe^{2+} (E_o=+0.771V)$$

$$Cr^{3+}+e^- \rightarrow Cr^{2+} (E_o=-0.407V)$$

where $E_o$ is the standard electrode potential of the reaction. If an Fe/Cr redox pair is utilized, the cell voltage between electrodes 108 and 110 would therefore nominally be 1.178 V.

If the electrolyte has a net higher positive electrode potential ($E_o$) compared to that of a Standard Hydrogen Electrode (SHE) during discharge of the system, then the electrolyte is called the catholyte. The complementary electrolyte is then called the anolyte. The SHE is generally defined as a platinized platinum electrode in redox reaction with a hydrogen electrolyte at 25 C.

In some embodiments of redox cell 100, the electrolyte in half-cell 102 is an acidic solution of $FeCl_2$, forming a cathode side of redox cell 100. The electrolyte in half-cell 104 is an acidic solution of $CrCl_3$, forming an anode side of redox cell 100. When source 124 supplies an appropriate positive voltage on the cathode with respect to the anode, thereby charging the electrolytes in redox flow cell 100, the following reactions take place:

Cathodic reaction in half-cell 102: $Fe^{2+} \rightarrow Fe^{3+} + e^-$.

Anodic reaction in half-cell 104: $Cr^{3+} + e^- \rightarrow Cr^{2+}$

Applying the external power supply affects an electron transfer, while a $Cl^-$ ion crosses IEM 106 from the anodic half-cell 104 to the cathodic half-cell 102 in order to preserve the charge balance. In the ideal situation, the fully charged flow cell consists of 100% $FeCl_3$ solution in half-cell 102 on the cathode side and 100% $CrCl_2$ solution in half-cell 104 on the anode side.

When the external power supply of source 124 is replaced with load 124, the cell begins to discharge, and the opposite redox reactions take place:

Cathodic reaction in half-cell 102: $Fe^{3+} + e^- \rightarrow Fe^{2+}$

Anodic reaction in half cell 104: $Cr^{2+} \rightarrow Cr^{3+} + e^-$

Therefore, in an ideal situation, the fully discharged flow cell consists of 100% $FeCl_2$ solution on the cathode side in half-cell 102 and 100% $CrCl_3$ solution on the anode side in half-cell 104 ($Cl^-$ ions having migrated from half-cell 102 to half-cell 104 during the reaction).

A variation of the Fe/Cr system described above is a redox cell with premixed Fe and Cr solutions (see Gahn et al, NASA TM-87034, which is herein incorporated by reference in its entirety). Because membranes such as IEM 106 are typically not perfectly perm-selective (i.e., selectively permeable), anolyte and catholyte eventually become cross-mixed over many cycles of charge and discharge, thus reducing the net system capacity. Gahn et al. proposed a remedy to this problem using a redox cell, both sides of which contain $FeCl_2$ and $CrCl_3$ solutions in 1:1 proportion in the completely discharged state. In the completely charged state, the anolyte comprises $CrCl_2$ and $FeCl_2$ in 1:1 proportion and the catholyte comprises $FeCl_3$ and $CrCl_3$ in 1:1 proportion. In this way, any cross-diffusion of species merely appears as a Coulombic inefficiency, and over time the 1:1 charge balance is maintained. Although the above example describes an Fe/Cr system, it is generally applicable to other Redox couples, such as for example all-Vanadium systems, (see Skyllas-Kazacos in U.S. Pat. No. 4,786,567, which is herein incorporated by reference in its entirety).

As suggested above, the IEM membranes in many conventional redox flow cells may suffer from deterioration of the membrane due to interactions with the electrolytes and low ion selectivity at operating temperatures. Some of these issues can be eliminated by using porous membranes without any active ion-exchange material. For example, Hruska & Savinell in their paper "Investigation of Factors Affecting Performance of the Iron-Redox Battery" published in the Journal of Electrochemical Society 1981, Vol. 128, No. 1, 18-25, demonstrate the use of porous membranes in an iron based redox battery system. However, as described in the Hruska paper, such a system is not a true flow battery system because iron is plated on one of the electrodes. Further, the system described in Hruska would operate without the membrane, albeit at lower efficiency.

Other flow battery and secondary non-flow battery systems also have used non ion-selective porous membranes. For example, lead-acid batteries use a porous membrane called a separator. In zinc-bromine flow battery systems, such porous membranes are used as well, but such systems have one of the half-cell reactions plating and de-plating a metal. Such systems would still work even without a membrane at all, despite lower efficiency. However, in true flow cells, where no plating or de-plating of, reactants occurs at the electrode, such as the iron-chromium system described above with respect to FIG. 1, the membrane substantially prevents mixing of the electrolytes and allows charging or discharging to occur.

In true redox flow batteries, where no plating or de-plating occurs at the electrodes, the characteristics of IEM 106 should be chosen to reduce cross-mixing of the electrolytes. Electrolyte cross-mixing results in Coulombic inefficiency. There is typically a trade-off between Coulombic inefficiency and other operational parameters. As such, consistent with some embodiments of the present invention, IEM 106 in cell 100 of FIG. 1 is a porous membrane with physical parameters arranged to substantially improve the system efficiency for non-plating redox flow cells. Further, some embodiments of IEM 106 can be arranged to function in redox flow battery systems where the anolyte and catholyte are substantially mixed with each other, either at the beginning of the operation, or during the operation of the battery.

Figure 2:
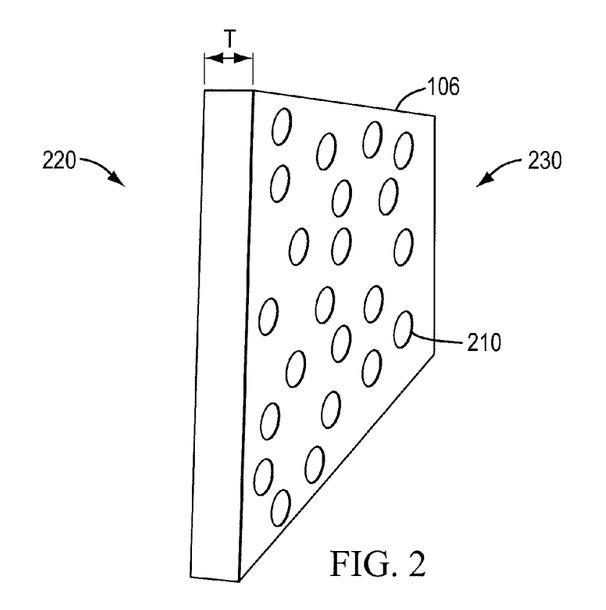
FIG. 2 illustrates a porous ion-exchange membrane that can be utilized in the reduction-oxidation cell shown in FIG. 1.

FIG. 2 illustrates an example of IEM 106, consistent with embodiments of the present invention, submerged in electrolytes 220 and 230. As discussed above, electrolytes 220 and 230 may be, for example, solutions of $FeCl_x$ and $CrCl_y$, may each be a mixed solution of $FeCl_x$ and $CrCl_y$, or may be any other combination of electrolytes, where x and y change depending upon battery charge state. Consistent with some embodiments, IEM 106 is a porous membrane with pores 210. Consistent with some embodiments of the present invention, a thickness T of IEM 106, the porosity Φ of IEM 106, and an average pore size P of pores 210 are balanced with electrolyte viscosity η and resistivity of electrolytes 220 and 230 in order to optimize performance of cell 100.

In a redox cell such as cell 100, cell resistance determines the efficiency of the cell, and therefore the capacity utilization. If cell 100 is charged with a current I, the cell open circuit voltage (OCV) is E, and the cell resistance is R, then the "Round Trip Voltaic Efficiency" (Ev_RT) of the cell is defined as $$Ev\_RT = \frac{E - IR}{E + IR}.$$

Also, the "Discharge Voltaic Efficiency" (Ev_Dis) of the cell is defined as $$Ev\_Dis = \frac{E - IR}{E}.$$

At any given current and OCV, which is representative of the state of the charge of cell 100, the cell resistance R determines both the voltage efficiencies. For a given peak power and total capacity requirement, a higher Ev_RT offers lower operating cost, and a higher Ev_Dis results in requirements for a smaller stack (i.e., number of coupled cells) and less amount of electrolyte chemicals. Both reducing the amount of required electrolyte and reducing the number of stack cells required to meet demands are economically favored. Therefore, maximizing Ev_RT and Ev_Dis by reducing R is a highly desired result. The cell resistance R is a composition of multiple resistances in series, including the solution resistance, reaction dynamic impedance, and electrode resistance. In many cases, the membrane resistance of IEM 106 also contributes to the total cell resistance R.

Another important parameter in the characterization of redox cell 100 is the Coulombic Efficiency (Ec), defined as the ratio of amount of coulombs of charge dispensed by cell 100 during discharge to that delivered to cell 100 during charge between two given states of charge. For example, if cell 100 can be charged from 20% total capacity to 80% total capacity in 10 minutes by applying a current of 1 Ampere, and can be discharged from 80% total capacity back to 20% total capacity in 5 minutes at a current of 1.5 Amperes, then the coulombic efficiency is given by $$Ec = \frac{1.5\ Amp \times 5\ \min}{1\ Amp \times 10\ \min} = 75\%.$$

The coulombic inefficiency (1-Ec) in a redox flow cell such as cell 100 is typically due to three major factors: (a) parasitic reactions that compete with the theoretical redox reactions; (b) flow of inter-cell shunt current; and (c) cross-diffusion of reactants through IEM 106 resulting in a cross-diffusion current. While parasitic reactions can be reduced by appropriate selection of system parameters and inter-cell shunt current can be reduced by constructing an appropriate manifold to control the flow within the stack, the cross-diffusion current is solely determined by the characteristics of IEM 106. A higher cross-diffusion current results in a lower Coulombic efficiency. If the current causing the Coulombic inefficiency is designated as Ic, and I represents the design load current of cell 100, then the Coulombic inefficiency is given by Coul_Ineff=$Ic/(I+Ic)$.

The Round Trip System Efficiency (Es_RT) of a redox flow battery, which may include one or more of cells 100, defines the global excellence of the battery and is a direct product of the Round Trip Voltaic and Coulombic efficiencies: Es_RT=Ev_RT*Ec. Similarly, the Discharge System Efficiency (Es_Dis), which defines the minimum stack size and electrolyte volume of the battery, is a direct product of the Discharge Voltaic Efficiency and Coulombic Efficiency: Es_Dis=Ev_Dis*Ec. In traditional redox flow battery systems using conventional IEMs, the cross-diffusion current is very low. Therefore, the contribution of the membrane to the Coulombic inefficiency Coul_Ineff is also very low—typically less than 0.5%. This low Coulombic inefficiency results because conventional membranes are highly ion-selective and no mass-transfer of the electrolytes takes place across the membrane.

On the other hand, conventional IEMs are easily fouled by oxidizers in high concentration (such as 2 Molar $FeCl_3$ solution, for example), and the resistance across the membrane increases significantly with higher concentration of salts. Many of these IEMs, due to their heterogeneous structure, become brittle and mechanically unstable over time and eventually fail. The voltaic efficiencies Ev_RT and Ev_Dis also suffer over time such that voltaic efficiencies Ev_RT of less than 70% and Ev_Dis of less than 80% under such circumstances can result. The system efficiencies Es_RT and Es_Dis similarly suffer such that, because Ec is close to 100%, the round-trip system efficiencies Es_RT can become about 60% and 75%, respectively. Cheaper alternative IEMs show a higher resistance with higher electrolyte concentration, resulting in the system efficiencies becoming even worse.

Alternatively, porous membranes may be utilized without any active ion exchange material. In that case, because there is no fouling issue, the resistance is generally small and largely independent of temperature and electrolyte concentration. The resistance of a porous membrane is largely dependent on the porosity and thickness of the membrane and the resistance of the electrolyte. The electrolyte enters the pores of the membrane and thereby establishes the membrane resistance. The voltaic efficiency Ev_Dis and Ev_RT can therefore be quite high and can reach greater than 90%, even at high concentration of electrolytes.

However, conventional porous membranes generally also allow mass transfer of electrolytes in addition to ion transfer. As a result, the cross-diffusion current can be high, substantially reducing the Coulombic efficiency. For example, conventionally utilized porous membranes can provide Coulombic efficiencies Ec of less than 60%. The system efficiency is then 90%*60%=54%, much below the system efficiency Es available for ion-selective based systems.

Consistent with embodiments of the present invention, IEM 106 is a porous membrane with high voltaic efficiency Ev and high coulombic efficiency. Porous membranes according to embodiments of the present invention have certain physical characteristics that can be arranged to limit the mass transfer to a minimum while still facilitating ionic transfer, which can result in higher system efficiencies.

The resistance of a porous membrane does not significantly depend on the pore size of the holes. The resistance instead depends on the electrolyte resistivity, thickness of the membrane, and porosity of the membrane. The relationship is given by:

$$Rm = \frac{\rho \times T}{f(\phi)},$$

where Rm is the effective area resistivity of the membrane, $\rho$ is the average resistivity of the electrolyte solution, T is the thickness of the membrane, and $\Phi$ is the porosity of the membrane. The function $\theta(\Phi)$ is a quasi-linear function of $\Phi$. While $\rho$ is a membrane-independent parameter, membranes with specific thickness T and porosity $\Phi$ can be manufactured in order to minimize resistance Rm.

However, the natural direction of increasing porosity $\Phi$ has geometric limitations (e.g., pore size and pore density). Similarly, decreasing the thickness T too much can result in a large cross-diffusion current, resulting in low Coulombic efficiency Ec. In porous membrane systems, however, there are other parameters available that can be adjusted by judicious production of the membrane in order to reduce the cross-diffusion of electrolytes. These parameters may not affect the resistance of the membrane significantly. If the pores are very small—micron sized or less—then the cross-diffusion current is (a) inversely proportional to the square of the thickness of the membrane (T in meters), (b) proportional to the average pore size (P in meters), (c) inversely proportional to average electrolyte viscosity (η in centi-Poise), and sensitive to the concentration difference of chemical species across the membrane. While the concentration difference is not a membrane parameter (i.e., a parameter that depends on the characterization of the membrane), but rather a function of the state of charge (SOC) of the system, the other parameters are membrane parameters. With these relationships, an empirical figure-of-merit (FOM) for IEM 106 in cell 100 can be defined to be $$FOM = \frac{T^2 \times \eta}{P}.$$

Figure 3:
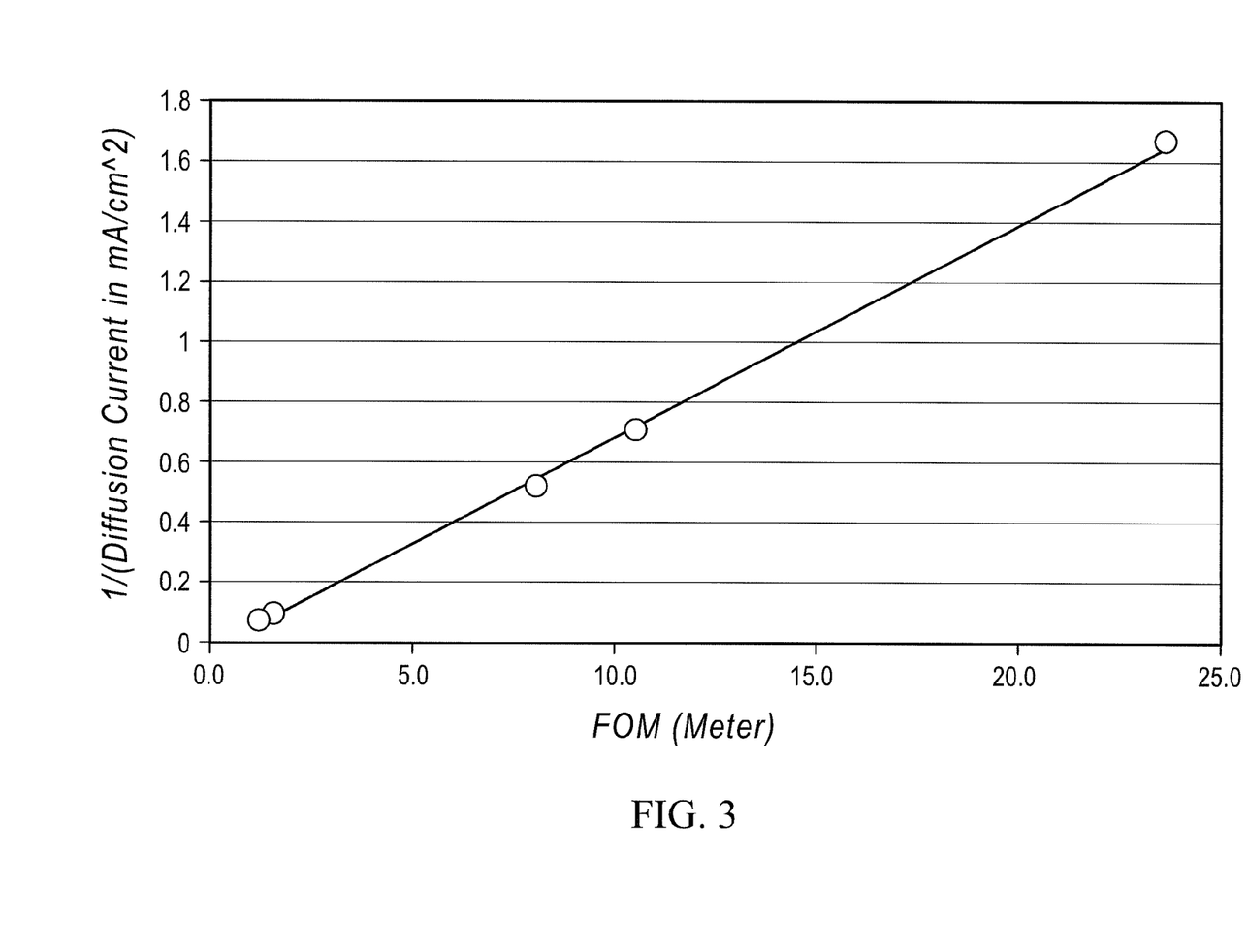
FIG. 3 illustrates the relationship between a figure-of-merit and a diffusion current in membranes consistent with embodiments of the present invention.

FIG. 3 illustrates the relationship between Diffusion Current Id and the FOM. As shown in FIG. 3, 1/Id is nearly linear with FOM. Further, very high diffusion currents are associated with low values of the FOM. For example, empirical observations suggest that in order to get a cross-diffusion current Id of less than, for example, 1 mA/cm$^2$, the FOM should be greater than about 15.

The FOMs for several porous membranes are provided below in Table I. Table I shows the FOM and diffusion currents for three porous membranes. Porous membrane A shown in Table I corresponds to the membrane utilized by Lopez-Atalaya et al. in their study of porous membranes. As discussed above, Lopez-Atalaya et al. replaced the conventional non-porous membrane with a nonselective microporous plastic separator made by Daramic Microporous Products, L.P. (11430 N. Community House Rd, Suite 35, Charlotte, N.C. 28277). As described by Lopez-Atalaya et al., membrane A has a Coulombic efficiency of 74% and the cell has an internal resistance between 3.1 Ohms and 3.4 Ohms for charge and discharge, respectively. Also, viscosity of the electrolyte is know to be 4.0 cP from its chemical composition, which is provided in Table 1 of pgs. 150 of Lopez-Atalaya et al. The FOM for membrane A is, therefore, about 1.6 m·cP, giving rise to a diffusion current of about Id=10 mA/cm$^2$. At the desired average current density of 40 mA/cm$^2$ the Coulombic cross-diffusion efficiency is about 25%, which is consistent with the reporting of Lopez-Atalya et al. Combined with the voltaic efficiency of 77% as reported in Lopez-Atalya et al., the Ev_RT for the membrane becomes about 56%, which is relatively poor.

Membranes B and C were produced consistently with some embodiments of the present invention. As such, membranes B and C are examples of membranes according to embodiments of the present invention. Membranes B and C are made from a polyolefin material and have a specified thicknesses and pore diameter. A manufacturer having the capability to manufacture these membranes, and other membranes consistent with embodiments of the present invention, is Daramic Microporous Products, L.P., 11430 N. Community House Rd., Suite 35, Charlotte, N.C. 28277. Typically membranes consistent with embodiments of the invention can be produced by extruding sheets of polyolefin with fillers such as glass fibers, and with oil particulates heterogeneously spread throughout the body of the sheet. After the extrusion, the sheet can be treated with a solvent or etchant to remove the oil particles, leaving behind pores. Properties like the thickness, pore size, pore density, and tortuousity are heavily process dependent and are often closely-guarded secrets of the manufacturer. However, these parameters can be specified to the manufacturer for production.

By determining particular pore diameter and thickness parameters of the membranes, the FOM of IEM 106 can be dramatically increased. The resulting performance of cell 100 utilizing IEM 106 is also dramatically increased. Membranes 106 of example membranes B and C shown in Table I have pore diameter and thickness parameters that are chosen consistent with embodiments of the present invention to increase the FOM. In membrane B, the thickness of the porous membrane is 1 mm, pore diameter is 0.4 microns, and the average viscosity of the electrolyte is 4.2 cP, giving an FOM of 10.5 m·cP. Experimentally, membrane B provided a diffusion current of 1.4 mA/cm$^2$. At a design average cell current density of 40 mA/cm$^2$, this cross-diffusion current has an inefficiency of 1.4/40=3.5%. In membrane C, the thickness is 1.5 mm, average pore diameter is about 0.4 μm, and the average electrolyte viscosity if 4.2 cP, giving an FOM of 23.6 m·cP and a resulting diffusion current of 0.6 mA/cm$^2$. At the design cell current density of 40 mA/cm$^2$, the Coulombic inefficiency due to cross-diffusion is only 0.6/40=1.5%. Table I illustrates the clear advantages of membranes B and C over that of membrane A, which was the membrane utilized by Lopez-Atalya et al.

In an example membrane, the value of FOM can be 15 m·cP, for example, for a desired 1 mA/cm$^2$ cross-diffusion current, which also has a desired cross diffusion inefficiency of, for example, 1%. For any other desired inefficiency and cell current density, the FOM appropriate for the new situation can be scaled. For example, if a Coulombic cross-diffusion inefficiency of 5% can be tolerated at a design average cell current density of 40 mA/cm$^2$, an FOM greater than about 15/(5%*40)=7.5 is sufficient. In another example, if a Coulombic cross-diffusion inefficiency of no more than 1% at an average cell current density of 10 mA/cm$^2$ is desired, then the FOM should be greater than 15/(1%*10)=150.

Table I also indicates the efficiencies for IEMs A, B, and C, which were discussed above. It may be seen that the FOM in membrane A was only 1.6, thus giving a round-trip system efficiency of Es_RT and diffusion efficiency of Es_Dis of 62% and 70%, respectively. In membrane C, however, the same parameters are 77% and 87%, respectively, a dramatic improvement in performance.

Most flow batteries are capable of running at 40 to 200 mA/cm$^2$ at full load, and therefore a few mA/cm$^2$ of cross-diffusion current contributes a very small fraction to the total inefficiency. Therefore, even a low value of FOM can be tolerated in full-load applications. However, in practical applications, the load of the flow battery is not full. In fact, the average is much lower than full, and at times the load can be very low, even close to zero. However, the diffusion current is load independent. At low average loads, the diffusion current can contribute significantly to the total inefficiency. It is therefore important to consider the round-trip system efficiency Es_RT at both low and high load currents in providing a porous membrane for a practical application.

Table II shows the Es_RT as a function of load current density for the prior art membranes A, B, and C. From Table II, at 40 mA/cm$^2$ or more of load current, membrane A has a round-trip efficiency Es_RT of 62%. At a load of 10 mA/cm$^2$ the round-trip efficiency Es_RT of membrane A has dropped to 29% and at a low load of 5 mA/cm$^2$ the round-trip efficiency as dropped to 26%. These efficiencies are very low and may not result in a practical battery cell. However, membranes B and C result in surprisingly better results, especially for low load current operation. Membrane B, for example, has a round-trip efficiency Es_RT of 61% at a low load of 5 mA/cm$^2$ (almost as good as membrane A's high load efficiency) and membrane C has a round trip efficiency Es_RT of 75% at a low load of 5 mA/cm² (which is better than is achieved by any of membrane A's efficiencies). Both of membranes B and C can be utilized to produce practical flow batteries with porous membranes.

Figure 4:
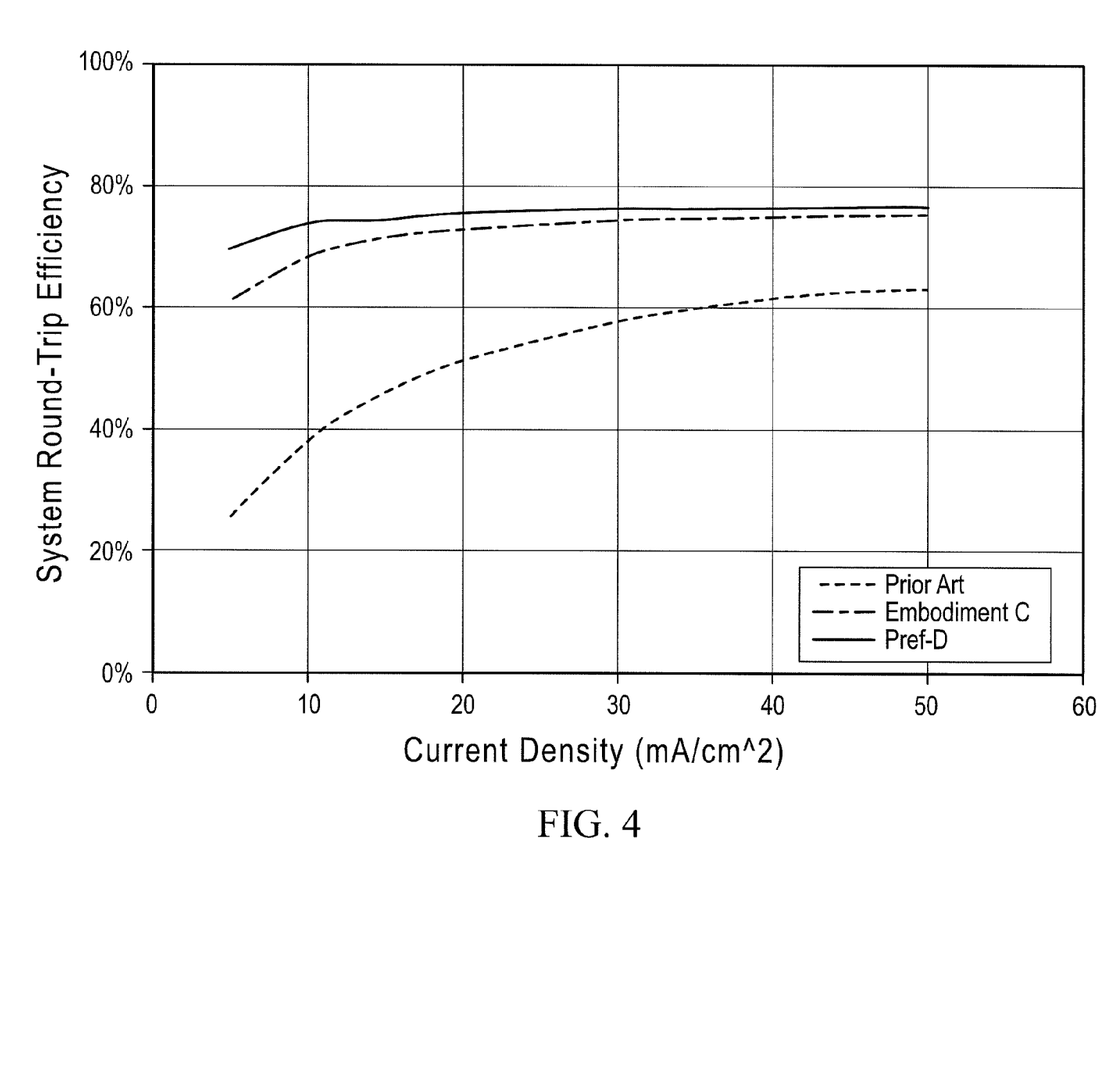
FIG. 4 illustrates the round-trip efficiency of a flow cell as a function of load current density for several porous membranes, including some membranes consistent with embodiments of the present invention.

FIG. 4 illustrates the round trip efficiency Es_RT as a function of load current density for each of membranes A, B, and C. As is amply demonstrated in FIG. 4, the low current density efficiencies of membranes B and C, the membranes according to embodiments of the present invention, are comparable or exceed the high current density efficiency of membrane A, which was utilized in Lopez-Atalaya et al. This high increase in efficiencies attainable by providing membranes with a FOM of greater than about 10 m·cP (the FOM of membrane B) was highly surprising and unexpected.

As is shown in Tables I and II, the FOM of membrane B is 10.5 m·cP. The FOM of membrane C is 23.6 m·cP. As is illustrated in Tables I and II, FOMs greater than 10 result in porous membranes with high efficiencies when utilized in a flow-cell battery. FOMs that are less than 2 do not result in membranes that can operate with high efficiency when utilized in a flow-cell battery. Membranes with FOMs between 2 and 10 may result in cell efficiencies that are intermediate between low efficiencies and the high efficiency cells attainable with some embodiments of the present invention.

Therefore, a membrane according to some embodiments of the present invention is obtained by first picking either a pore size or a membrane thickness. Then, a particular value is set for FOM based on the desired efficiencies and operating parameters of the battery that will be formed with the membrane. Finally, the undetermined one of the pores size or membrane thickness is determined such that the particular value of FOM is met or exceeded. In some embodiments, a minimum FOM of greater than 2, and often greater than 10, is utilized.

In capillary cross-diffusion media, the mass transfer is dependent on the cosine of the contact angle. The contact angle is essentially determined by the wettability of the membrane surface with the solution surrounding that surface, i.e., the electrolytes. By modifying the surface to be more hydrophilic or hydrophobic one can change the mass transfer characteristics, and therefore the FOM relationship. For example, a treatment of the surface of IEM 106 with a dilute fluorinated material such as Teflon, reduces the contact angle (by reducing the wettability) and the FOM is also reduced. FOM relationships in such cases can be empirically and experimentally determined for each such surface modification.

Porous membranes are extracted with oils and plasticizers. Such organic compounds can often reduce the current transfer and catalytic ability of the electrodes, and result in reduced voltaic efficiency. In some embodiments of the present invention, such substances can be removed from IEM 106 by chemical leaching. For example, some oils in examples of IEM 106 have been leached out by submersion in a solvent such as Tri-Chloro Ethylene, for example.

In order to optimize the total system efficiency Es, one can use the equations above to first determine the FOM and therefore the Ec, then using the other parameters one can determine Ev. Technically and commercially feasible membranes can be analyzed according to the above figure of merit to determine the best membrane in terms of system efficiency Es optimization. Additionally, once the system operations requirements, such as average cell current density, acceptable voltaic efficiencies Ev and coulombic efficiencies Ec are known, limits on membrane parameters can be determined and vendors can be tasked with producing membranes with the required parameters.

In view of the embodiments described herein, the present invention has been shown to provide a means of selecting a porous membrane that improves the system efficiency of a redox cell. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

TABLE I

| IEM | Thickness (meters) | Pore Dia. (meters) | Vicosity (cP) | FOM (meter · cP) | Diffusion Current (mA/cm^2) | Design Current (mA/cm^2) | Inefficiency | Ec | Ev_RT | Ev_Dis | Es_RT | Es_Dis |
|---|---|---|---|---|---|---|---|---|---|---|---|---|
| A | 6.00E−04 | 9.00E−07 | 4 | 1.6 | 10 | 40 | 20% | 80% | 77% | 88% | 62% | 70% |
| B | 1.00E−03 | 4.00E−07 | 4.2 | 10.5 | 1.4 | 40 | 3% | 97% | 78% | 88% | 75% | 85% |
| C | 1.50E−03 | 4.00E−07 | 4.2 | 23.6 | 0.6 | 40 | 1% | 99% | 78% | 88% | 77% | 87% |

TABLE II

| IEM | Thickness (meters) | Pore Dia (meters) | Vicosity (cP) | FOM (meter · cP) | Diffusion Current (mA/cm^2) | Load Current (mA/cm^2) | Inefficiency | Ec | Ev_RT | Ev_Dis | Es_RT | Es_Dis |
|---|---|---|---|---|---|---|---|---|---|---|---|---|
| A | 6.00E−04 | 9.00E−07 | 4 | 1.6 | 10 | 5 | 67% | 33% | 77% | 88% | 26% | 29% |
|   | 6.00E−04 | 9.00E−07 | 4 | 1.6 | 10 | 10 | 50% | 50% | 77% | 88% | 39% | 44% |
|   | 6.00E−04 | 9.00E−07 | 4 | 1.6 | 10 | 15 | 40% | 60% | 77% | 88% | 46% | 53% |

TABLE II-continued

| IEM | Thickness (meters) | Pore Dia (meters) | Vicosity (cP) | FOM (meter · cP) | Diffusion Current (mA/cm^2) | Load Current (mA/cm^2) | Inefficiency | Ec | Ev_RT | Ev_Dis | Es_RT | Es_Dis |
|---|---|---|---|---|---|---|---|---|---|---|---|---|
|  | 6.00E−04 | 9.00E−07 | 4 | 1.6 | 10 | 20 | 33% | 67% | 77% | 88% | 51% | 58% |
|  | 6.00E−04 | 9.00E−07 | 4 | 1.6 | 10 | 25 | 29% | 71% | 77% | 88% | 55% | 63% |
|  | 6.00E−04 | 9.00E−07 | 4 | 1.6 | 10 | 30 | 25% | 75% | 77% | 88% | 58% | 66% |
|  | 6.00E−04 | 9.00E−07 | 4 | 1.6 | 10 | 35 | 22% | 78% | 77% | 88% | 60% | 68% |
|  | 6.00E−04 | 9.00E−07 | 4 | 1.6 | 10 | 40 | 20% | 80% | 77% | 88% | 62% | 70% |
|  | 6.00E−04 | 9.00E−07 | 4 | 1.6 | 10 | 45 | 18% | 82% | 77% | 88% | 63% | 72% |
|  | 6.00E−04 | 9.00E−07 | 4 | 1.6 | 11 | 50 | 18% | 82% | 77% | 88% | 63% | 72% |
| B | 1.00E−03 | 4.00E−07 | 4.2 | 10.5 | 1.4 | 5 | 22% | 78% | 78% | 88% | 61% | 69% |
|  | 1.00E−03 | 4.00E−07 | 4.2 | 10.5 | 1.4 | 10 | 12% | 88% | 78% | 88% | 68% | 77% |
|  | 1.00E−03 | 4.00E−07 | 4.2 | 10.5 | 1.4 | 15 | 9% | 91% | 78% | 88% | 71% | 81% |
|  | 1.00E−03 | 4.00E−07 | 4.2 | 10.5 | 1.4 | 20 | 7% | 93% | 78% | 88% | 73% | 83% |
|  | 1.00E−03 | 4.00E−07 | 4.2 | 10.5 | 1.4 | 25 | 5% | 95% | 78% | 88% | 74% | 84% |
|  | 1.00E−03 | 4.00E−07 | 4.2 | 10.5 | 1.4 | 30 | 4% | 96% | 78% | 88% | 75% | 84% |
|  | 1.00E−03 | 4.00E−07 | 4.2 | 10.5 | 1.4 | 35 | 4% | 96% | 78% | 88% | 75% | 85% |
|  | 1.00E−03 | 4.00E−07 | 4.2 | 10.5 | 1.4 | 40 | 3% | 97% | 78% | 88% | 75% | 85% |
|  | 1.00E−03 | 4.00E−07 | 4.2 | 10.5 | 1.4 | 45 | 3% | 97% | 78% | 88% | 76% | 86% |
|  | 1.00E−03 | 4.00E−07 | 4.2 | 10.5 | 1.4 | 50 | 3% | 97% | 78% | 88% | 76% | 86% |
| C | 1.50E−03 | 4.00E−07 | 4.2 | 23.6 | 0.6 | 5 | 11% | 89% | 78% | 88% | 70% | 79% |
|  | 1.50E−03 | 4.00E−07 | 4.2 | 23.6 | 0.6 | 10 | 6% | 94% | 78% | 88% | 74% | 83% |
|  | 1.50E−03 | 4.00E−07 | 4.2 | 23.6 | 0.6 | 15 | 4% | 96% | 78% | 88% | 75% | 85% |
|  | 1.50E−03 | 4.00E−07 | 4.2 | 23.6 | 0.6 | 20 | 3% | 97% | 78% | 88% | 76% | 86% |
|  | 1.50E−03 | 4.00E−07 | 4.2 | 23.6 | 0.6 | 25 | 2% | 98% | 78% | 88% | 76% | 86% |
|  | 1.50E−03 | 4.00E−07 | 4.2 | 23.6 | 0.6 | 30 | 2% | 98% | 78% | 88% | 76% | 87% |
|  | 1.50E−03 | 4.00E−07 | 4.2 | 23.6 | 0.6 | 35 | 2% | 98% | 78% | 88% | 77% | 87% |
|  | 1.50E−03 | 4.00E−07 | 4.2 | 23.6 | 0.6 | 40 | 1% | 99% | 78% | 88% | 77% | 87% |
|  | 1.50E−03 | 4.00E−07 | 4.2 | 23.6 | 0.6 | 45 | 1% | 99% | 78% | 88% | 77% | 87% |
|  | 1.50E−03 | 4.00E−07 | 4.2 | 23.6 | 0.6 | 50 | 1% | 99% | 78% | 88% | 77% | 87% |

What is claimed is:

1. A method of providing a porous membrane for a flow cell, comprising:
   choosing a figure of merit defined as $FOM = (T^2 \eta)/P$ where T is the thickness, P is the pore size, and $\eta$ is an average viscosity of the electrolytes of the flow cell;
   choosing one of a pore size or a thickness for the porous membrane;
   determining the other of the pore size or the thickness for the porous membrane based on the figure of merit and the viscosity of the electrolyte; and
   constructing a porous membrane having the determined pore size and thickness.

2. The method of claim 1, wherein choosing the figure of merit comprises:
   choosing the figure of merit to be greater than 10 based on a target cross-diffusion current when the porous membrane is utilized in the flow cell.

3. The method of claim 2, wherein the electrolyte is an Fe/Cr electrolyte.

4. The method of claim 3, wherein constructing the porous membrane includes constructing the porous membrane from polyolefin.

5. The method of claim 4, wherein constructing the porous membrane includes
   extruding a sheet of polyolefin with a filler;
   treating the sheet with a solvent to remove the filler.

* * * * *